United States Patent [19]

Garg

[11] Patent Number: 5,516,347
[45] Date of Patent: May 14, 1996

[54] MODIFIED ALPHA ALUMINA PARTICLES

[75] Inventor: Ajay K. Garg, Northborough, Mass.

[73] Assignee: Saint-Gobain/Norton Industrial Ceramics Corp., Worcester, Mass.

[21] Appl. No.: 417,323

[22] Filed: Apr. 5, 1995

[51] Int. Cl.⁶ .................................................. C09C 1/68
[52] U.S. Cl. ................................ 51/309; 501/153
[58] Field of Search .................... 51/293, 309, 295, 51/298; 501/153, 119, 120, 121

[56] References Cited

U.S. PATENT DOCUMENTS

| | | | |
|---|---|---|---|
| 4,314,827 | 2/1992 | Leitheiser et al. | 51/298 |
| 4,623,364 | 11/1986 | Cottringer et al. | 51/309 |
| 4,744,802 | 5/1988 | Schwabel | 51/309 |
| 4,964,883 | 10/1990 | Morris et al. | 51/309 |
| 5,190,567 | 3/1993 | Tamamaki | 51/293 |
| 5,192,339 | 3/1993 | Hasegawa et al. | 309/309 |
| 5,215,551 | 6/1993 | Hatanaka et al. | 51/309 |

FOREIGN PATENT DOCUMENTS 2099012  12/1982  United Kingdom ............ B24D 3/34

OTHER PUBLICATIONS

Kumagi et al, "Enhanced Densification of Boehmite Sol-Gels by Alumina Seeding", Communications of the American Ceramic Society, Nov. 1984.

*Primary Examiner*—Deborah Jones
*Attorney, Agent, or Firm*—David Bennett

[57] ABSTRACT

Seeded sol-gel alumina abrasive grits with improved grinding performance incorporating alkali metal oxides selected from rubidium and cesium oxides.

10 Claims, No Drawings

MODIFIED ALPHA ALUMINA PARTICLES

BACKGROUND OF THE INVENTION

This invention relates to aluminous abrasive grits and particularly to sol-gel alumina abrasive materials with improved grinding performance.

Sol-gel alumina abrasives are conventionally produced by drying a sol or gel of an alpha alumina precursor which is usually but not essentially, boehmite; breaking up the dried gel into particles of the desired size; then firing the pieces to a temperature sufficiently high to convert them to the alpha alumina form. Simple sol-gel processes are described for example in U.S. Pat. No. 4,314,827; 4,518,397; 4,881,951 and British Patent Application 2,099,012.

In a particularly desirable form of sol-gel process, the alpha alumina precursor is "seeded" with a material having the same crystal structure as, and lattice parameters as close as possible to, those of alpha alumina itself. The "seed" is added in as finely divided form as possible and is dispersed uniformly throughout the sol or gel. It can be added ab initio or it can be formed in situ. The function of the seed is to cause the transformation to the alpha form to occur uniformly throughout the precursor at a much lower temperature than is needed in the absence of the seed. This process produces a crystalline structure in which the individual crystals of alpha alumina, (that is those areas of substantially the same crystallographic orientation separated from adjacent crystals by high angle grain boundaries), are very uniform in size and are essentially all sub-micron in diameter. Suitable seeds include alpha alumina itself but also other compounds such as alpha ferric oxide, chromium suboxide, nickel titanate and a plurality of other compounds that have lattice parameters sufficiently similar to those of alpha alumina to be effective to cause the generation of alpha alumina from a precursor at a temperature below that at which the conversion normally occurs in the absence of such seed. Examples of such seeded sol-gel processes are described in U.S. Pat. No. 4,623,364; 4,744,802; 4,954,462; 4,964,883; 5,192,339; 5,215,551; 5,219,806 and many others.

Many of the patents in this area focus on the use of additives, (which are generally refractory oxides), to modify the properties of the grain, particularly the hardness. Many of these appear to act as crystal growth modifiers or as generators, in conjunction with the alumina, of spinels or magnetoplumbite structures within the alumina crystals or at the grain boundaries. About the only metals oxides that have been excluded have been the alkali metals, which have, since the earliest patent on the subject, been considered detrimental to the performance of sol-gel alumina abrasives. The one exception to this has been U.S. Pat. No. 5,190,567 which teaches that lithium oxide is surprisingly found to be effective to produce fine microstructures.

GENERAL DESCRIPTION OF THE INVENTION

One aspect of the present invention provides a sol-gel alumina abrasive grit which comprises from about 0.01% to about 2% by weight of an oxide selected from the group consisting of rubidium oxide, cesium oxide and mixtures thereof.

In another aspect of the invention a sol-gel alumina is provided which comprises from about 0.1 to about 20% of an oxide selected from the group consisting of magnesium oxide and zirconia and mixtures thereof, and from about 0.01% to about 2% by weight of an oxide selected from the group consisting of rubidium oxide, cesium oxide and mixtures thereof.

In a further aspect of the invention the sol-gel alumina is a seeded sol-gel alumina and comprises from about 2 to about 10% of magnesium oxide and from about 0.05 to about 1% by weight of an oxide selected from the group consisting of rubidium oxide, cesium oxide and mixtures thereof.

When the sol-gel alumina is a seeded alumina the seed used is preferably alpha alumina. The seed should be as finely divided as practically possible in order to achieve the greatest possible number of nucleating sites for a given weight of seed. Generally seed that is smaller than about 0.1 micron and more preferably less than about 0.05 micron is selected. If the contamination of the alumina is not a problem, it is also possible to use alpha ferric oxide or a material that yields the oxide upon heating such as the "hydrous iron polymer" used in U.S. Pat. No. 4,954,462 which readily generates seed in a very finely divided form upon heating.

The total amount of rubidium oxide, cesium oxide or mixture of these oxides present in the sol-gel alumina abrasives of the invention may be from about 0.01 to about 2%, preferably from about 0.03 to about 1% and most preferably from about 0.05 to about 0.5% based on the total weight of alumina in the abrasive grain.

It is found that the rubidium or cesium oxide performs particularly well when it is present together with magnesium oxide. The magnesium oxide is most often present in the form of a spinel and the total amount, calculated as MgO, can be from about 0.1 to about 20% and more preferably from about 0.5 to about 15% of the total weight of alumina in the abrasive grain.

DESCRIPTION OF PREFERRED EMBODIMENTS

The invention is now described in terms of certain formulations within the scope of the invention. These are not however to be taken as indicating any necessary limitation on the essential scope of the invention.

EXAMPLE 1 (COMPARATIVE)

7,000 gm of boehmite, ("Disperal" obtainable under that trade name from Condea Gmbh), was mixed in a Ross mixer with 50,000 gm of deionized water and 2,333 gm of a 6% solids aqueous slurry of alpha alumina particles with a surface area of about 120 $m^2$/gm. The dispersion was continuously mixed under vacuum. To this stirred dispersion was added a solution of 400 gm of 70% nitric acid in 50,000 gm of deionized water and stirring was continued for a further 10 minutes before adding a solution of 1781 gm of magnesium nitrate hexahydrate in 10,000 gm of deionized water followed by a further 15 minutes of mixing. At the end of this time the dispersion was in the form of a gel.

About 17,275 gm of this gel were dried at 90° C. for 2–3 days, then at 125° C. until the gel was dry and crisp. This dried gel was then crushed to lumps from about 0.6 to about 1.2 mm in diameter and then fired in a directly pre-heated rotary furnace comprising a silicon carbide tube about 15 cm in diameter, about 215 cm in length with a hot zone about 63 cm in length. The tube was inclined at about 6° to the horizontal and rotating at about 12 rpm. The grains exploded and simultaneously densified in the furnace to a density of about 3.87 gm/cc.

EXAMPLE 2

The formula of Example 1 was followed exactly except that 25.2 gm of a 5% solution of rubidium nitrate was mixed with 17,275 gm of the gel before it is dried.

The abrasive grits obtained from Examples 1 and 2 were tested for their abrasive properties in a coated abrasive structure with the grits held by a phenolic resin. The results of two duplicate runs are set forth in Table 1 below.

TABLE 1

|  | TEST-1 | | TEST-2 | |
| --- | --- | --- | --- | --- |
|  | GM. CUT | REL. PERF. | GM. CUT | REL. PERF. |
| EX. 1 (Con) | 5.98 | 100% | 6.07 | 100% |
| EX. 2 (Inv) | 8.39 | 140% | 8.31 | 137% |

EXAMPLE 3 (COMPARATIVE)

900 kg of water were added to a mixing tank and 118 kg of an aqueous slurry containing 4% by wt. of alpha alumina seed having a BET surface area of about 120 $m^2$/gm were added along with 567 kg of boehmite, ("Disperal" available under that trade name from. Condea GmbH), and 40.5 kg of 21% nitric acid. The mixture was then mixed with a high-speed disperser blade and evacuated to eliminate air bubbles. The pH of the mixture was about 4.

This dispersion was then homogenized by passage through an in-line homogenizer at a rate of 10.6 liters/minute along with 0.6 liters/minute of 21% nitric acid. The resulting gel was dried, roll-crushed and sintered in a pre-heated rotary furnace at about 1300° C. for about 10 minutes. This material was screened to a 50T grit size for testing in a coated abrasive product. (See Table 2 below).

EXAMPLE 4

A dispersion of 14,850 gm of Condea "Disperal" in 100,000 gm of deionized water in a Ross Mixer were mixed with 4950 gm of a 6% solids slurry of alpha alumina seeds having a BET surface area of about 120 $m^2$/gm. The dispersion was maintained under vacuum while being continuously agitated. A solution of 1060 gm of 70% nitric acid in 10,000 gm of deionized water. A solution of 3,778 gm of magnesium nitrate hexahydrate in 30,000 gm of deionized water was then added followed by 20.60 gm of rubidium nitrate in 10,000 gm of deionized water and a further 20,000 gm of deionized water.

This dispersion was in sol-gel form and this was mixed for a further 5 minutes before being dried. This dried gel was then broken up into smaller than 0.5 to 1 cm pieces which were then fired at about 1330° C. in a pre-heated rotary furnace having a silicon carbide tube 15 cm in diameter and 215 cm long with a hot zone about 61.6 cm long inclined at 6° to the horizontal and rotating at about 12 rpm. The fired grains had a density of greater than 3.8 gm/cc and were made up of crystals less than 0.2 micron in diameter as measured by the average intercept method. The grits were screened to a 50T size and used to make a coated abrasive product.

The abrasion performance of the products of Examples 3 and 4 were evaluated in the form of abrasive belts 150 cm long by 6.25 cm wide, containing 590 gm of grits per square meter, in which the grits were held in phenolic resin maker and size coats.

The belts were tested in a fixed force mode running at a linear speed of 900 surface meters/minute under an aqueous coolant. The cut time was four minutes and the material cut was a stainless steel bar held against the belt at a force of 6.75 kg. The total grams of the steel cut in the test were measured.

TABLE 2

| SAMPLE | GMS CUT | REL. PERFORM. |
| --- | --- | --- |
| Example 3 (Comp.) | 74 | 100% |
| Example 4 | 107 | 146% |

EXAMPLE 5

A grain similar to that prepared in Example 1 (Comparative) was prepared with the difference that 25.5 g of a 5% solution of rubidium nitrate was mixed with 17275 g of the gel before the gel was dried and fired to form the abrasive grits. In all other respects the procedure was identical.

The grain produced according to the processes of Examples 1, 3 and 5 were compared as to grinding performance in a coated abrasive test rig in which grit (−45+50 mesh) were retained by phenolic resin maker and size coats. A supersize coat containing $KBF_4$ was added to each. Identical amounts of grit, maker, size and supersize coats were used in each case. The test rig was used to cut 304 stainless steel using a water-based coolant and grinding was continued until cutting was no longer detected. In each case the total amount of steel cut was measured. The results are set forth in Table 3 below.

TABLE 3

| Example | ADDITIONS to S.G. | GM. CUT | REL. PERFORM. |
| --- | --- | --- | --- |
| 3 (Comp) | — | 4.74 | 100% |
| 1 (Comp) | MgO | 6.06 | 126% |
| 5 Inv. | MgO + $Rb_2O$ | 8.39 | 177% |

From the above data it is quite clear that the improvement obtained as a result of the addition of the rubidium oxide is a highly significant one and quite unpredictable on the basis of the known teaching in the art.

EXAMPLE 6

A further product according to the invention was prepared by a process in which 14,850 g of Condea's "Disperal" boehmite was mixed with 100,000 g of deionized water in a Ross mixer. To this mixture were added 4,959 g of a 6% solids slurry of alpha alumina seeds with a surface area of about 120 $m^2$/g. As the mixture was kept continuously stirred under vacuum, a solution of 1,060 g of 70% nitric acid in 10,000 g of deionized water was added followed by a further 10 minutes of mixing. Then a solution of 3778 g of magnesium nitrate hexahydrate in 30,000 g of deionized water were added and mixing was continued for a further 15 minutes. The next addition was 20.60 g of rubidium nitrate in 10,000 g of deionized water followed by a further 20,000 g of deionized water and a further 10 minutes of mixing. This mixture was then dried and the dried gel was broken to particles 0.5 to 1.0 cm in diameter which were then fired in a rotary furnace of the kind described in Example 4. The fired grits obtained had a density of greater than 3.80 g/cc and comprised alpha alumina crystallites less about 0.2 micron in size as measured by the average intercept method.

The grits were screened to 50T size and used to make a conventional coated abrasive belt which was then used to grind 304 stainless steel in a fixed force mode test. An aqueous coolant was used as the belt was used to cut the steel for 20 minutes under a fixed force of 6.75 kg. The total steel cut at the end of this time was measured.

The same evaluation technique was used to produce an identical abrasive belt except for the use of grain made according to the methods described Example 3. The results are set forth in Table 4.

TABLE 4

| Example | ADDITIONS to S.G. | GM. CUT | REL. PERFORM. |
|---------|-------------------|---------|---------------|
| 3 (Comp) | — | 218 | 100% |
| 6 Inv. | MgO + $Rb_2O$ | 354 | 166% |

EXAMPLE 7

110,000 gm of deionized water were added to a Ross mixer followed by 3,960 gm of a 6% solids slurry of alpha alumina seed having a surface area of about 120 $m^2$/gm. This mixture was mixed while 14,850 gm of Disperal from Condea GmbH were added. Mixing under vacuum was continued for 5 minutes. A solution of 1,060 gm of 70% nitric acid in 10,000 gm of deionized water were then added and mixing under vacuum was continued for a further 10 minutes. A solution of 3,778 gm of magnesium nitrate hexahydrate in 10,000 gm of deionized water were then added and mixing under vacuum continued for a further 15 minutes or so. Finally a solution of 20.49 g of cesium nitrate in 5,000 gm of deionized water were added with mixing under vacuum for a further 5 minutes. The resulting gel was then dried and broken up into 0.5 to 1 cm pieces and fed directly in a preheated rotary furnace with a hot zone maintained at 1383° C. The furnace comprised a silicon carbide tube with a diameter of 15 cm and a length of 215 cm with a hot zone of about 60 cm. The tube was rotated at about 12 rpm and was inclined at about 6° to the horizontal.

The grain so obtained (−45+50 mesh) was evaluated by a coated abrasive technique against the grains produced in Examples 3 and 1 (both comparative). The results appear in Table 5 below.

TABLE 5

| Example | ADDITIONS to S.G. | GM. CUT | REL. PERFORM. |
|---------|-------------------|---------|---------------|
| 3 (Comp) | — | 4.74 | 100% |
| 1 (Comp) | MgO | 6.06 | 126% |
| 7 Inv. | MgO + $Cs_2O$ | 7.91 | 167% |

What is claimed is:

1. A sol-gel alumina abrasive grit which comprises from about 0.01 to about 2% by weight of an alkali metal oxide selected from the group consisting of rubidium oxide, cesium oxide and mixtures thereof.

2. A sol-gel alumina abrasive according to claim 1 which further comprises from about 0.1 to about 20% by weight of an oxide selected from the group consisting of magnesium oxide and zirconia.

3. A sol-gel alumina abrasive according to claim 1 in which the alumina is a seeded sol-gel alumina.

4. A sol-gel alumina abrasive according to claim 1 in which the alkali metal oxide is rubidium oxide.

5. A seeded sol-gel alumina abrasive grit which comprises from about 0.03 to about 1% by weight of rubidium oxide and from about 0.5 to about 15% by weight of magnesium oxide.

6. A seeded sol-gel alumina abrasive grit which comprises from about 0.05 to about 0.5% by weight of rubidium oxide and from about 0.5 to about 15% by weight of magnesium oxide.

7. A bonded abrasive comprising an abrasive grit according to claim 1.

8. A bonded abrasive comprising an abrasive grit according to claim 5.

9. A coated abrasive comprising an abrasive grit according to claim 1.

10. A coated abrasive comprising an abrasive grit according to claim 5.

* * * * *